April 17, 1928.
T. H. CLEMENTS
1,666,487
MEANS FOR CONTROLLING AND MEASURING GAS SUPPLY
Filed Jan. 11, 1926
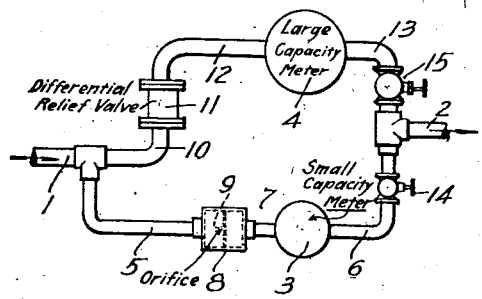
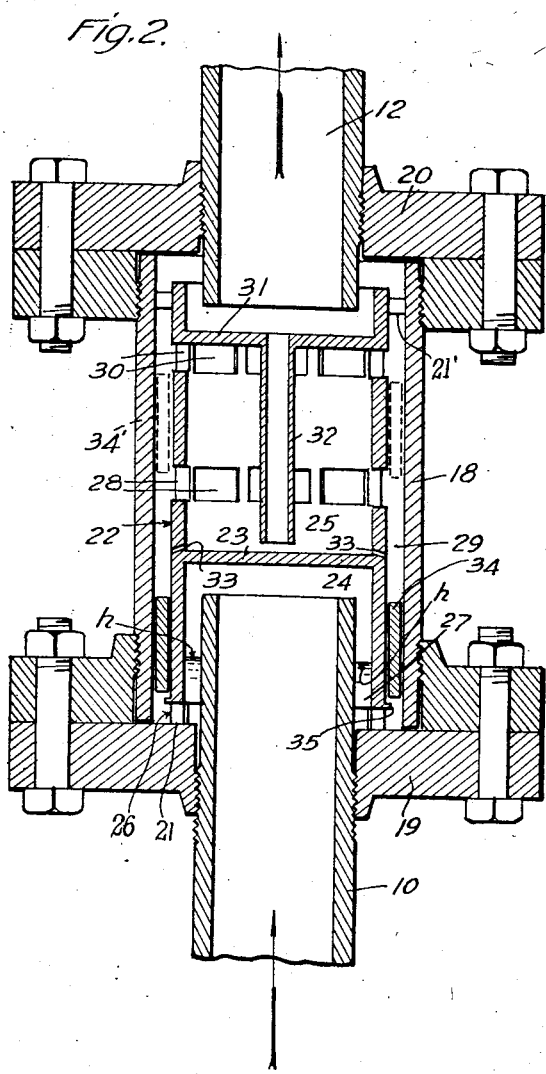
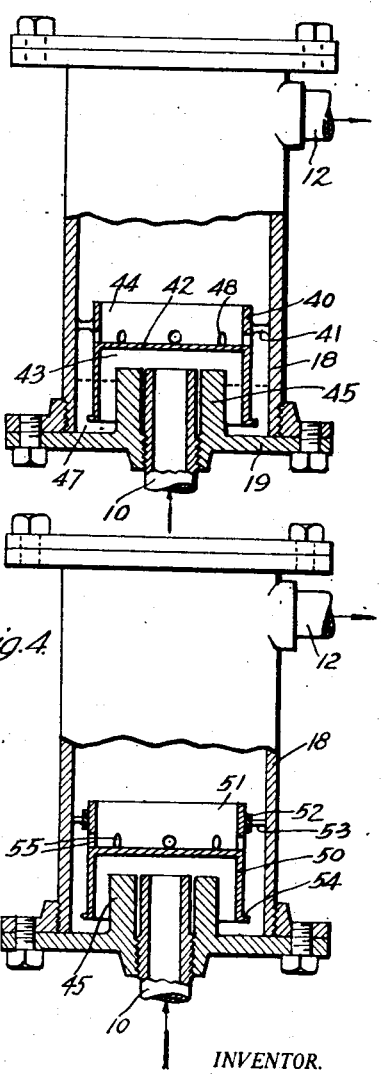
INVENTOR.
Thomas H. Clements
BY Arthur P. Knight
ATTORNEY.

Patented Apr. 17, 1928.

1,666,487

UNITED STATES PATENT OFFICE.

THOMAS H. CLEMENTS, OF LOS ANGELES, CALIFORNIA, ASSIGNOR OF ONE-HALF TO F. C. MILLARD ENGINEERING COMPANY, OF LOS ANGELES, CALIFORNIA, A CORPORATION OF CALIFORNIA.

MEANS FOR CONTROLLING AND MEASURING GAS SUPPLY.

Application filed January 11, 1926. Serial No. 80,469.

This invention relates to means for controlling and measuring the supply of gas through one or more connected supply lines and the main object of the invention is to provide an improved means for this purpose.

An important application of my invention is in connection with the supply of gas such as fuel gas or illuminating gas to a distributing main. In such cases the flow of gas varies considerably from time to time, and it is customary to provide a small capacity meter for operation at low rates of supply and a large capacity meter for operation at higher rates of supply and to direct the gas flow, either manually or automatically, through one or the other of said meters according to the existing rate of supply. A particular object of my invention is to provide in connection with a system of this type an apparatus of improved construction whereby the flow of gas is automatically transferred from the small capacity meter to the large capacity meter when the rate of gas flow reaches a certain amount and is automatically returned to the small capacity meter when the rate of gas flow falls below a certain amount. A further object of the invention is to provide efficient means whereby the gas stream is at all times directed substantially wholly through which ever one of the meters is in operation so as to prevent simultaneous partial flow through both meters with resulting inaccuracies in measurement. Some of the devices which have heretofore been used for automatically controlling the flow of gas through one or the other of the meters have been of such type that when the flow of gas is near the critical point, that is, near the point at which the transfer from one meter to the other is intended to be made, the gas flow is divided between the two meters in such manner that a relatively small flow of gas is maintained through the large capacity meter. Such large capacity meter is not adapted to accurately measure the flow of such small amounts of gas and very inaccurate measurement is therefore obtained. By providing for substantially complete transfer of the gas stream from one meter to the other I overcome this disadvantage. According to my invention the gas flow is either substantially wholly through the large capacity meter or not at all through such meter so that the inaccurate measurement readings due to passage of small amounts of gas through the large capacity meter are eliminated.

A further object of my invention is to provide an improved type of differential relief valve for controlling the flow of gas to one or the other of said meters. The relief valve according to my invention, although it is particularly advantageous for use in this connection may also be used for other purposes where the flow of gas is to be transferred between two or more connecting lines.

The accompanying drawings illustrate embodiments of my invention and referring thereto:

Fig. 1 is a diagrammatic view of means according to my invention for controlling and accurately measuring the supply of gas for example to a distributing main.

Fig. 2 is a vertical section of a form of differential relief valve according to my invention.

Figs. 3 and 4 are vertical sections of modified forms of differential relief valve.

The general application of my invention is illustrated in Fig. 1 wherein 1 designates a gas supply pipe leading from any source of illuminating or other gas for example nautral gas, oil gas, water gas, etc., and 2 designates an outlet pipe leading to a distributing main or other means for supplying the gas to points of consumption. Two gas meters 3 and 4 are connected to the respective pipes 1 and 2, gas meter 3 being of a relatively small capacity for example up to 15 cu. ft. per second and gas meter 4 being of relatively large capacity say from 10 to 50 cu. ft. per second. Means are provided in the connections 5 and 6 leading from the pipe 1 through meter 3 to the outlet 2 for interposing a definite resistance to the flow of gas through this connection including meter 3, this means consisting, for example, of an orifice device such as is generally used for this purpose and comprising a chamber connected at opposite ends to the pipe 5 leading from the supply pipe 1 and to a pipe 7 leading to the meter 3, said chamber having a partition indicated in dotted lines at 8 provided with an orifice 9.

A pipe 10 leads from supply pipe 1 to a differential relief valve 11 and from such differential relief valve a pipe 12 leads to the large capacity meter 4 from which a pipe 14 leads to the outlet pipe 2. Manual control valves 14 and 15 may be provided in the respective pipe connections 6 and 13.

The function of the differential relief valve is to control the gas flow through the respective branches including the small capacity meter 3 and the large capacity meter 4 in such manner that below a certain critical pressure difference between the supply pipe 1 and the outlet pipe 2 the flow will be substantially confined to the branch including the small capacity meter 3 whereas when the pressure difference exceeds a certain valve the flow will be substantially diverted to the branch including the large capacity meter. Various forms of valves may be used for this purpose for example, the form shown in Fig. 2 comprising a cylindrical casing 18 connected at its lower and upper ends respectively to headers 19 and 20 to which are also secured the respective pipes 10 and 12 aforesaid. Within the casing 18 is mounted a cylinder or tubular member 22 supported in fixed position within the casing for example by webs or studs 21 and 21' and formed with a horizontal partition 23 which divides the space within the cylinder 22 into a lower chamber 24 and an upper chamber 25, the chamber 24 being open at its bottom and its walls terminating somewhat above the bottom plate or header 19 so as to form a passage 26 establishing communication between chamber 24 and the space 29, between tubular member 22 and casing 18. The pipe 10 extends upwardly within the chamber 24 aforesaid and terminates below the horizontal partition 23. The cylinder 22 is spaced from the pipe 10 and from the casing 18 so as to form a chamber or liquid seal receptacle extending between the pipe 10 and the casing 18, this chamber being occupied by a body of fluid such as mercury indicated at 27, which may normally fill the said chamber to the depth indicated at ($h$), and the cylinder 22 dips into this body of mercury so as to form a liquid seal. The chamber 25 constitutes an auxiliary receptacle for liquid, said chamber 25 being at a higher level than the liquid seal receptacle and being adapted to receive and retain liquid forced up into same from the liquid seal receptacle, as hereinafter described. Cylinder 22 is provided with ports 28 above the level of the horizontal partition 23 to establish communication between the chamber 25 and the space 29 between said cylinder and the casing 18. The upper end of cylinder 22 may be closed by a partition or head 31 located somewhat below the upper end of the cylinder and said cylinder may have ports 30 leading from the upper chamber 25 to the space 29 between the cylinder and the casing 18, the upper end of the cylinder 22 being spaced from the top plate or header 20 and the outlet pipe 12 extending downwardly below the top of cylinder 22 but spaced from the horizontal partition 31 so as to provide a tortuous passage from the chamber 25 to the outlet pipe 12 around the partition 31 which acts as a baffle plate. From the plate 31 drain pipe 32 may extend downwardly nearly to the horizontal partition 23. The member 22 is provided with one or more small ports or openings 33 through which liquid may drain back gradually to the liquid receptacle at the bottom of the casing 18, these openings being sufficiently small to constrict and retard the flow of such liquid as hereinafter described. In order to make the operation of the device more positive I prefer to use a sliding valve ring shown at 34 which slides vertically between the cylinder 22 and the casing 18 and normally floats on the body of sealing liquid. An outwardly projecting flange 35 may be provided at the bottom of the casing of the cylinder 22 which normally supports valve ring 34 above the bottom of passage 26 so as to permit gas pressure from the inlet chamber to be exerted beneath said valve ring to raise the same as hereinafter set forth.

In the operation of this form of my invention the valve ring 34 normally floats on the mercury in the seal so that its weight is added to that of the liquid seal in obstructing the flow of gas. This valve may be of steel or similar material. When the pressure difference between the inlet pipe 10 and the outlet pipe 12 is below a certain critical value the level of the mercury will vary but it will always maintain a liquid seal, the pressure not being sufficient to completely displace the mercury to the point required for permitting gas to pass under the lower edge of the cylinder 22. When the critical pressure difference is reached which enables the gas pressure in the pipe 10 to displace the level of the mercury between the upper part of the pipe 10 and the cylinder 22 to the level of the bottom of said cylinder, then gas will tend to pass under the bottom of the cylinder 22 and force the mercury violently upward together with the valve ring 34 until the valve ring passes the ports 28 and occupies the position indicated in dotted lines at 34'. The gas then tends to escape under the lower edge of the cylinder 22 and upwardly through the passage 29 between said cylinder and the casing 18 and through ports 28 into the upper chamber 25 and thence through ports 30 to the passage means leading to the outlet pipe 12. The mercury which is forced up from the liquid seal passes through the ports 28 into the bottom part of the upper chamber 25 and is retained by the horizontal partition 23, the space above said partition constituting an auxiliary liquid receptacle adapted to retain the body of mercury or other liquid and prevent it from returning to the seal until the pressure drops below the critical value. By thus retaining the liquid used as a seal in an auxiliary receptacle and preventing it from returning or causing it to be returned slowly to the liquid seal receptacle the resistance offered by the differential relief valve is reduced to a minimum so that the gas may pass substantially unobstructedly through the differential relief valve under these conditions. The hole or holes 33 are made of sufficiently small cross-sectional area to ensure that the amount of liquid returning or draining back to the liquid seal receptacle is relatively small and such liquid draining back is immediately returned or blown back to the auxiliary receptacle by the outflowing gas. The slide valve 34 is maintained during the above described operation in position above the ports 28 as indicated in dotted lines in the drawing, the amount of pressure difference required for maintaining the valve in this position being relatively small. When, however, the gas velocity decreases below a certain value the valve is allowed to fall and rests on flange 35, thus forming a temporary obstruction. The mercury or other liquid then drains back through holes 33 and re-establishes the liquid seal. This slide valve may however be omitted as the device will operate without the use of this valve. When this slide valve is omitted the operation is similar to that above described, the action of the gas pressure when the pressure difference between the inlet and outlet exceeds a certain amount, resulting in driving the mercury or other liquid in the seal upwardly into the auxiliary receptacle in chamber 25 thereby permitting relatively free passage of gas from the inlet 10 to the outlet 12. When the pressure difference between the inlet and outlet is again reduced to a certain small critical value the mercury or other liquid drains back through the holes 33 into the liquid seal receptacle, re-establishing the liquid seal.

When the gas is blowing the liquid upwardly into the auxiliary receptacle above described and while the gas is passing through the differential relief valve in the manner above described more or less mercury or other liquid used in the seal may be carried upwardly in the gas above the auxiliary receptacle, but such entrained liquid is eventually removed from the gas by the operation of the baffle plate 31 and by reason of the deflection of the gas in its passage around the baffle plate and into the outlet pipe, any liquid so removed from the gas collecting in the auxiliary receptacle in chamber 25 or being drained into said receptacle through the drain pipe 32.

Fig. 3 shows a simpler form of my invention in which the auxiliary liquid receptacle is formed in a cylindrical member 40 mounted within the casing 18 in such manner as to be fixed or retained in stationary position therein, for example by means of ribs 41, said cylindrical member having a horizontal partition 42 dividing the space within said member into a lower chamber 43 and an upper chamber 44, the latter acting as an auxiliary chamber for the sealing liquid. The lower head 19 for the casing 18 is in this case shown as provided with a hub 45 extending upwardly within the casing 18 and forming in conjunction with said casing a liquid seal chamber 47, the cylindrical member 40 extending downwardly into said liquid seal receptacle to form the liquid seal. The auxiliary liquid receptacle 44 is provided with small drainage outlets indicated at 48 for gradually draining the liquid back into the liquid seal when the pressure falls below a given point. In the operation of this form of my invention the mercury or other sealing liquid normally occupies the liquid seal receptacle so as to cut off passage of gas from the inlet 10 to the outlet 12, but when the gas pressure exceeds a certain critical amount the liquid is blown over or displaced from the liquid seal receptacle to the auxiliary receptacle 44 wherein it is retained until the pressure falls again to a certain critical amount, whereupon the liquid will drain back through the holes 48 from the auxiliary receptacle 44 to the sealing chamber 47, again cutting off passage of gas through the differential relief valve.

In applying my invention to the control of the gas supply to a metering system having small and large capacity meters as shown in Fig. 1 the operation is as follows: Under conditions of relatively small gas supply or relatively small gas consumption there will be a small pressure difference between the inlet pipe 1 and the outlet pipe 2, this pressure difference being determined by the pressure supplied to pipe 1 and the resistance presented by the orifice device 8, it being assumed that the capacity of the pipe 2 and the meter 3 is sufficient to always maintain a relatively low pressure at the outlet of the orifice device. Assuming that the pressure difference under these conditions is such as to result in a gas flow within the capacity of the meter 3 the gas flow will pass wholly through the branch or pipe connections leading through the small capacity meter 3, the differential relief valve 11 serving to seal or cut off the flow of gas through the branch including the large capacity meter. For this purpose the differential relief valve 11 is so constructed and proportioned as above described as to maintain the seal or shut off condition as long as the pressure difference between the inlet and outlet thereof does not exceed the cirtical value representing the pressure difference corresponding to maximum flow which the meter 3 is adapted to register. When this maximum flow is attained the pressure difference between the inlet pipe 1 and the outlet pipe 2 becomes sufficient to displace the liquid seal in the differential relief valve and transfer the liquid therein into the auxiliary receptacle whereupon the obstruction to the passage of gas through the branch including the large capacity meter is reduced to such a small amount that substantially the whole flow of the gas takes place through the differential relief valve and the large capacity meter. As the large capacity meter 4 is adapted to register with sufficient accuracy volumes of gas corresponding to pressure differences in excess of the critical pressure difference referred to, the amount of gas delivered will be satisfactorily and effectively registered by this large capacity meter under these conditions. When the supply of gas at inlet 1 is reduced so as to lower the pressure difference to a certain value below the capacity of the meter 4 to register correctly the differential relief valve again closes or seals this connection, causing the entire flow of gas to pass through the small capacity meter 3 which is adapted to register correctly on small amounts of gas. It will be understood that the device will operate in the same manner in case the variations in pressure difference arise from variations in the consumption or withdrawal of gas from the outlet 12 instead of from variations of supply of gas from inlet 10 or from variations at both inlet and outlet.

Various modifications may be made in the differential relief valve, especially in regard to the general application of the same to the control or transfer of connection between two meters of different capacity than shown in Fig. 1. The form of my invention shown in Fig. 4 is similar to that shown in Fig. 3 except that the cylindrical member 50 which is provided with auxiliary liquid receptacle 51 is adapted to slide vertically within a guide ring 52 mounted on arms 53 within the casing 18, the construction being otherwise as above described. In this case the effect of increase of pressure difference beyond a certain critical value is not only to force the sealing liquid into the auxiliary receptacle 51 but to raise said auxiliary receptacle, for example until it is arrested by a flange 54 thereon striking the guide means 52 on the casing 18, thereby further diminishing the obstruction to passage of gas through the differential valve. When the pressure difference is again reduced a certain amount the member 50 falls by gravity to normal position as shown in Fig. 4 and the liquid in the auxiliary receptacle therein drains back to the liquid seal receptacle through outlets 55.

I claim:

1. A differential relief valve for gas comprising a casing, gas inlet means extending into the lower end of the casing and projecting upwardly within the casing and spaced therefrom to form a liquid seal receptacle between said upwardly projecting portion of the gas inlet means and the wall of the casing, a tubular member mounted in fixed position within the casing and having a portion extending downwardly around said upwardly projecting portion of the gas inlet means so as to extend into the liquid in the liquid seal receptacle and said tubular member being formed with an auxiliary liquid receptacle above the liquid seal receptacle, said auxiliary liquid receptacle being open at its upper portion to communicate with the space between the said tubular member and the wall of the casing to permit liquid which is forced from the liquid seal by the pressure of the gas from the gas inlet to pass into said auxiliary liquid receptacle, said auxiliary liquid receptacle being provided with opening means of restricted area for draining liquid therefrom back into said space between said tubular member and the wall of the casing, and gas outlet means communicating with the upper portion of the chamber within said casing.

2. A construction as set forth in claim 1, and comprising in addition, liquid receiving means provided at the upper end of said tubular member and below the said gas outlet means and provided with a drainage means extending downwardly therefrom to conduct liquid collecting in said liquid receiving means to said auxiliary liquid receptacle.

3. A construction as set forth in claim 1 and comprising in addition liquid receiving means provided at the upper end of said tubular member and below the said gas outlet means and provided with a drainage means extending downwardly therefrom to conduct liquid collecting in said liquid receiving means to said auxiliary liquid receptacle, said gas outlet means projecting downwardly through the top of the casing so as to extend within said liquid receiving means provided at the upper end of said tubular member.

4. A construction as set forth in claim 1 and comprising in addition a valve ring mounted to slide between said tubular member and the wall of the casing, said tubular member being provided, at its lower portion with passage means establishing communication between the liquid seal chamber and the space between said tubular member and the wall of the casing, and said tubular member being provided at a portion thereof above said liquid seal receptacle with opening means establishing communication from said space to the interior of said tubular member above said auxiliary liquid receptacle, and means for limiting the downward movement of said valve ring so that it does not pass below said passage means in the lower portion of said tubular member.

In testimony whereof I have hereunto subscribed my name this 21st day of December, 1925.

THOMAS H. CLEMENTS.